(12) United States Patent
Matteson

(10) Patent No.: US 7,805,808 B2
(45) Date of Patent: Oct. 5, 2010

(54) REVERSIBLE DOOR WITH INTEGRAL PIVOT PIN

(75) Inventor: Michael L. Matteson, Kansas City, KS (US)

(73) Assignee: Schroer Manufacturing Company, Kansas City, KS (US)

( * ) Notice: Subject to any disclaimer, the term of this patent is extended or adjusted under 35 U.S.C. 154(b) by 296 days.

(21) Appl. No.: 11/655,680

(22) Filed: Jan. 19, 2007

(65) Prior Publication Data

US 2008/0172947 A1    Jul. 24, 2008

(51) Int. Cl.
*E05D 7/10*    (2006.01)
(52) U.S. Cl. ................... 16/267; 16/266; 16/270; 16/310; 16/315; 16/318; 16/331; 16/334; 119/481; 119/452; 119/461; 119/496; 119/501
(58) Field of Classification Search ........... 16/266, 16/267, 270, 273, 309, 310, 312, 315, 318, 16/331, 334, 385; 43/66, 100, 102–105; 119/481, 492, 499
See application file for complete search history.

(56) References Cited

U.S. PATENT DOCUMENTS

| | | | | |
|---|---|---|---|---|
| 359,237 A * | 3/1887 | White | ................ | 43/66 |
| 362,343 A * | 5/1887 | White | ................ | 43/66 |
| 1,129,011 A * | 2/1915 | Pyle | ................ | 220/485 |
| 1,257,244 A * | 2/1918 | Kaizumi | ................ | 43/64 |
| 1,458,943 A * | 6/1923 | Kinney | ................ | 508/102 |
| 1,975,633 A * | 10/1934 | Cakora | ................ | 242/375.1 |
| 2,179,931 A * | 11/1939 | Harris | ................ | 16/274 |
| 2,293,569 A * | 8/1942 | Sonion | ................ | 52/71 |
| 2,456,419 A * | 12/1948 | Jackson et al. | ................ | 220/6 |
| 2,530,148 A * | 11/1950 | Bjorklund et al. | ................ | 119/474 |
| 2,683,892 A * | 7/1954 | Gorman | ................ | 16/312 |
| 2,685,103 A * | 8/1954 | Forkey | ................ | 16/318 |
| 2,892,562 A * | 6/1959 | Smithson | ................ | 220/7 |
| 3,026,559 A * | 3/1962 | Benham | ................ | 16/284 |
| 3,036,209 A * | 5/1962 | Wasselle | ................ | 362/344 |
| 3,072,954 A * | 1/1963 | Patriquin | ................ | 16/66 |
| 3,216,053 A * | 11/1965 | Felix | ................ | 16/380 |
| 3,216,054 A * | 11/1965 | Cain | ................ | 16/390 |
| 3,235,903 A * | 2/1966 | Anderson | ................ | 16/392 |
| 3,244,146 A * | 4/1966 | Kurtz et al. | ................ | 119/481 |
| 3,396,425 A * | 8/1968 | Metcalfe | ................ | 16/228 |
| 3,451,124 A | 6/1969 | Steiner et al. | | |
| 3,499,183 A | 3/1970 | Parsons | | |
| 3,545,031 A | 12/1970 | Dielman | | |
| 3,556,058 A * | 1/1971 | Smiler | ................ | 119/474 |
| 3,905,333 A * | 9/1975 | Uhrig | ................ | 119/479 |
| 3,921,225 A | 11/1975 | Suska | | |

(Continued)

*Primary Examiner*—Victor Batson
*Assistant Examiner*—Roberta Delisle
(74) *Attorney, Agent, or Firm*—Stinson Morrison Hecker LLP

(57) ABSTRACT

A door assembly for pivotally securing a door to an animal enclosure or other enclosure. The door assembly comprises a pivot pin assembly integrally formed with the door and a hinge secured to the enclosure adjacent the opening. The pivot pin assembly preferably comprises a vertically oriented pivot pin integrally formed with upper and lower horizontal support members extending from upper and lower ends of the pivot pin across a portion of the door. The pivot pin is fitted within a hinge barrel formed within the hinge in a manner to permit the pivot pin to rotate within the barrel such that the door may be pivoted from an open to a closed position.

34 Claims, 3 Drawing Sheets

U.S. PATENT DOCUMENTS

| | | | | |
|---|---|---|---|---|
| 4,419,788 A * | 12/1983 | Prout | | 16/300 |
| 4,500,146 A * | 2/1985 | Peterson | | 312/257.1 |
| 4,542,558 A * | 9/1985 | Brockhaus | | 16/263 |
| 4,570,574 A * | 2/1986 | Burkholder | | 119/481 |
| 4,631,777 A * | 12/1986 | Takimoto | | 16/315 |
| 4,713,861 A | 12/1987 | Bancroft | | |
| 4,762,085 A * | 8/1988 | Ondrasik | | 119/474 |
| 4,819,582 A * | 4/1989 | Lichvar | | 119/474 |
| 4,852,213 A * | 8/1989 | Shewchuk | | 16/266 |
| 4,917,047 A | 4/1990 | Wazeter, III | | |
| 5,036,796 A * | 8/1991 | deMuy et al. | | 119/481 |
| 5,075,928 A * | 12/1991 | Bobrowski | | 16/273 |
| 5,097,796 A | 3/1992 | Reimers | | |
| 5,107,569 A * | 4/1992 | Hughes | | 16/2.1 |
| 5,373,809 A * | 12/1994 | Sphar | | 119/481 |
| 5,549,073 A | 8/1996 | Askins et al. | | |
| 5,626,098 A | 5/1997 | Askins et al. | | |
| 5,653,194 A * | 8/1997 | Guy | | 119/453 |
| 5,790,162 A * | 8/1998 | Adams et al. | | 347/222 |
| 5,987,710 A * | 11/1999 | Paul et al. | | 24/130 |
| 6,155,206 A * | 12/2000 | Godshaw | | 119/453 |
| 6,195,931 B1 * | 3/2001 | Johnson | | 43/105 |
| 6,345,591 B1 * | 2/2002 | Richmond | | 119/497 |
| 6,460,486 B1 * | 10/2002 | Powers et al. | | 119/452 |
| 6,481,056 B1 | 11/2002 | Jesse | | |
| 6,681,720 B1 * | 1/2004 | Skurdalsvold et al. | | 119/474 |
| 6,851,771 B2 * | 2/2005 | Marler et al. | | 312/249.8 |
| 7,300,081 B1 * | 11/2007 | Murray et al. | | 294/58 |
| 2001/0047567 A1 * | 12/2001 | Guillemette | | 16/353 |
| 2002/0023311 A1 * | 2/2002 | Holt | | 16/221 |
| 2002/0124351 A1 | 9/2002 | Lowry et al. | | |
| 2005/0016073 A1 * | 1/2005 | Petta et al. | | 49/504 |

\* cited by examiner

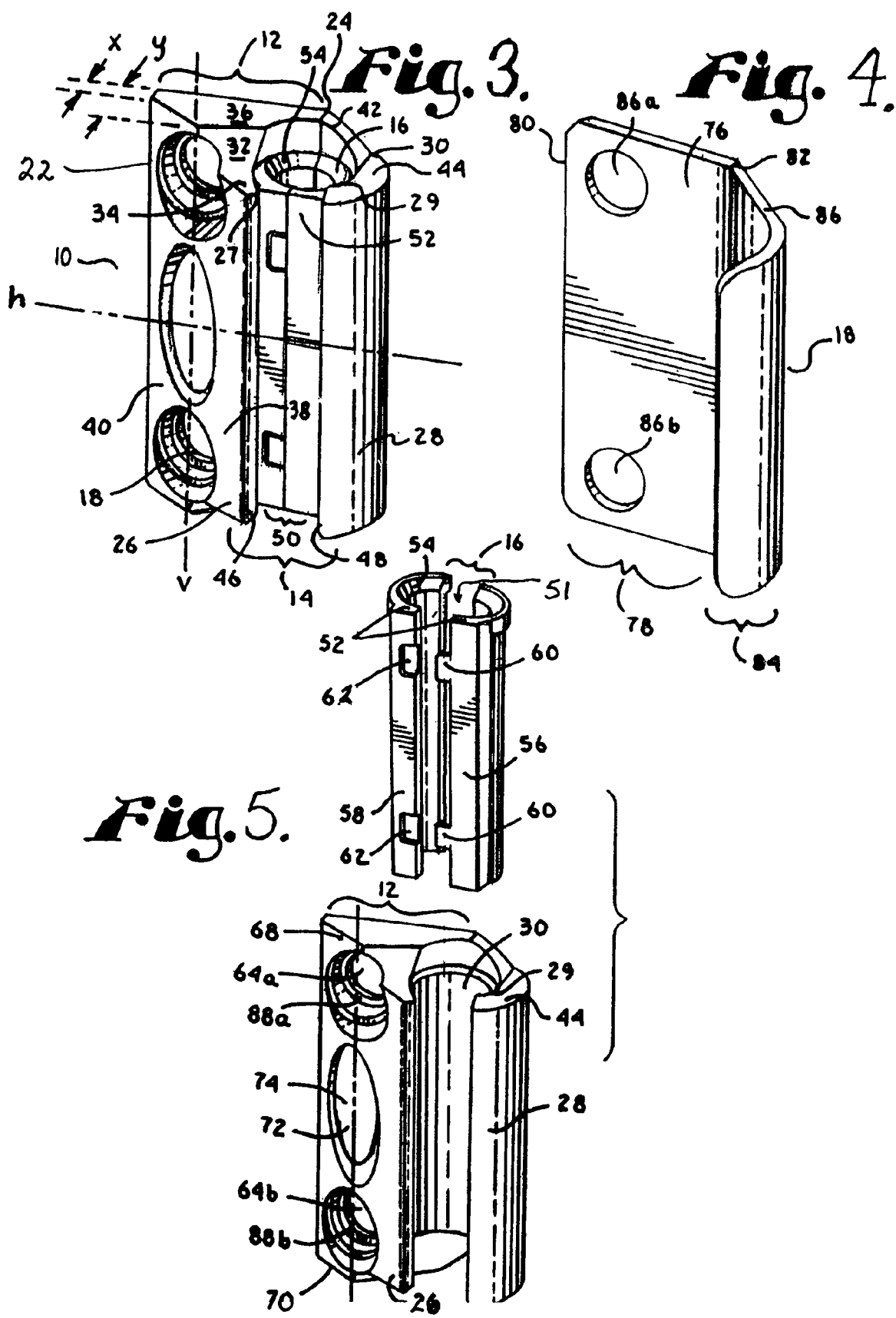

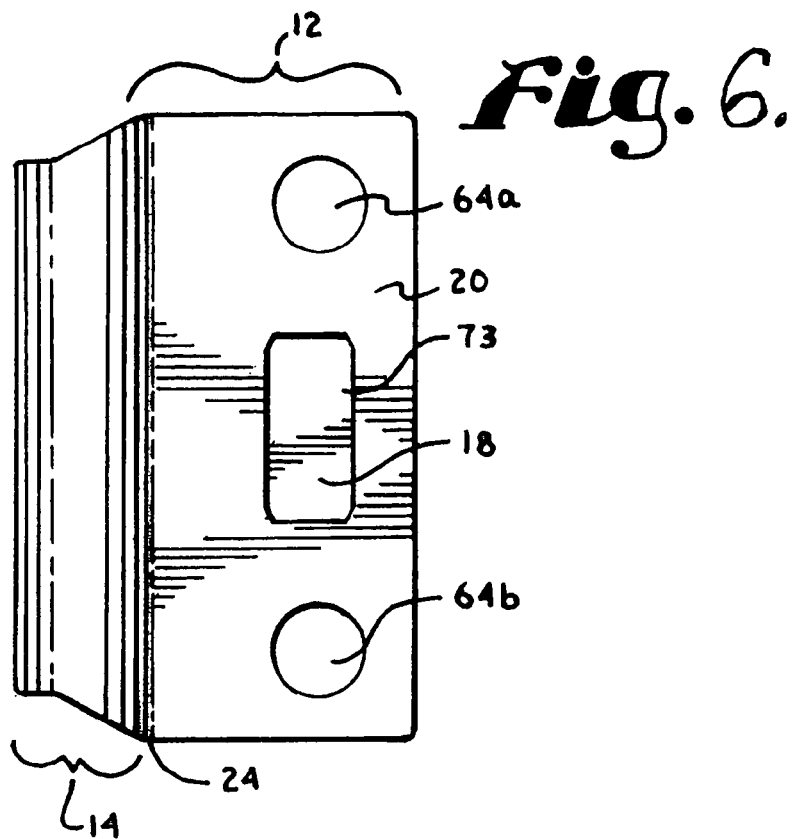
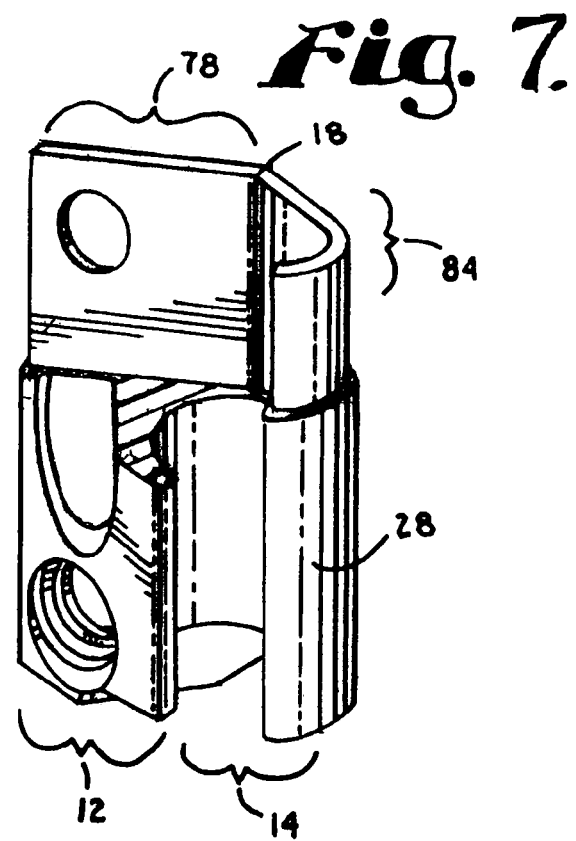

REVERSIBLE DOOR WITH INTEGRAL PIVOT PIN

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The present invention relates to doors for animal enclosures and other enclosures and is more specifically directed to an improved door assembly for pivotally connecting a door to an enclosure in a manner that more evenly distributes the load of the door, reduces the potential for sagging and allows for removal and reattachment of the door with greater ease.

2. Description of Related Art

Animal cages, pens, kennels, runs, and other types of enclosures are generally accessed and closed by pivoting doors secured to the side of the opening in the enclosure via hinges that allow the door to be moved between open and closed positions. Various configurations of hinges are known, with the most common type being an interlocking leaf type comprising two separate leaf pieces attached with a hinge pin. The first leaf, for attachment to a frame or other portion of the enclosure, has a series of protruding barrel segments, with the second leaf, for attachment to a door, having corresponding offset barrel segments. The offset barrel segments of the first and second leaves are interlocked, with a separate hinge pin inserted into the barrel formed by the aligned barrel segments to join the two leaves. The door is thus attached to the frame or other portion of the enclosure, and can pivot between open and closed positions.

While known hinges do provide for supporting and pivoting a door, they also have numerous drawbacks. With the interlocked leaf configuration, the door leaf moves with respect to the frame leaf, pivoting around the inserted hinge pin. Thus, smooth operation of the hinge is hindered by the fact that the edges of the barrel segments of the door leaf engage the edges of the barrel segments of the interlocked frame hinge. This contact between the door leaf and frame leaf may interfere with operation of the hinge and can result in unwanted noise. Furthermore, in such a configuration, the weight of the door on the barrel segments translates to a twisting moment on the barrel segments of the leaves. This continuous twisting moment may even twist the barrel segments themselves, allowing the door to sag. While this sagging can be somewhat alleviated by providing larger hinges with more barrel segments, or more commonly, by using several hinges on a single door to distribute the weight of the door between the hinges, the problem is not fully eliminated. Over time and continued use, the hinge connection weakens and the door begins to sag and become more difficult to close.

Removal and reattachment of traditionally hinged doors can be difficult. In removing such a door, separate tools are often needed to extract the hinge pin. This can be especially difficult as the hinge pin is often stuck within the barrel segments of the hinge leaf. Reattaching the door can also be challenging because the individual barrel segments on each hinge leaf must be perfectly aligned for receipt of the hinge pin. Even when new, this can be a tricky process due to a door's size, shape and weight. In addition, when doors, frames, or hinge leafs are warped, damaged or out of square, reattachment can be nearly impossible.

Thus, it can be seen that there remains a need in the art for a pivoting door structure with enhanced load distribution to reduce sagging and that provides for a smoother, quieter operation and easier removal and reattachment.

BRIEF SUMMARY OF THE INVENTION

The present invention is directed to a door assembly for use on an animal cage or other enclosure comprising at least one pivot pin assembly integrally formed with the door and a cooperating hinge secured to the enclosure. The pivot pin assembly includes a vertically oriented pivot pin integrally formed with at least one horizontal support member extending from the pivot pin across a portion of the door. A hinge barrel formed within the hinge is configured to receive the pivot pin such that the pivot pin may rotate within the barrel, thereby moving the door from an open to a closed position. Given that the pivot pin is integrally formed with the door in a vertically aligned position relative to the door, the load is more evenly distributed throughout the door and hinge than with conventional systems utilizing a separate hinge pin. Furthermore, door removal and reattachment can be easily and conveniently accomplished manually without the need for additional tools.

In a preferred embodiment, the door includes at least two pivot pin assemblies and each pivot pin assembly comprises horizontal support members extending from the upper and lower ends of the pivot pin at about a 90-degree angle from the pivot pin. The pivot pins are aligned along one side of the door and the horizontal support members extend from the pivot pins horizontally across a majority of the door toward the opposite side of the door. The use of upper and lower horizontal support members further enhances correct alignment of the door so as to minimize, if not fully eliminate, the potential for sagging or twisting over time. In this preferred embodiment, a two-piece bushing is fitted around the pivot pin and then secured within the hinge barrel. The bushing is preferably formed of a low friction material and is preferably self-lubricating, so as to enable the pivot pin to freely rotate within the bushing in a smooth and quiet manner. The bushing may include a key or other device for locking the bushing in the hinge barrel so as to prevent movement of the bushing as the pivot pin rotates. Support shoulders may be provided along the outer upper edge of the hinge barrel to present horizontal surfaces on which the upper horizontal support member may rest. A reinforcing member may also be embedded within the hinge to strengthen the hinge and ensure more equal distribution of the load.

In another embodiment of the invention, the door assembly is reversible such that the same door and hinges may be utilized to provide an enclosure with a right-handed door or an enclosure with a left-handed door. In this embodiment, the pivot pin assembly comprises upper and lower horizontal support members as described above, such that the pivot pin assembly is substantially symmetrical in nature about a horizontal axis. In addition, in this embodiment, the hinges are configured to be substantially symmetrical about a horizontal axis. In this manner, the upper and lower ends of the pivot pin assemblies and the hinges are identical, such that they can be reversed for attachment to opposite sides of the enclosure opening.

Additional aspects of the invention, together with the advantages and novel features appurtenant thereto, will be set forth in part in the description that follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

The present invention will be described in greater detail in the following detailed description of the invention with reference to the accompanying drawings that form a part hereof, in which:

FIG. 3 is a perspective view of a hinge of the door assembly of FIG. 1.

FIG. 4 is a perspective view of a reinforcing member embedded in the hinge of FIG. 3.

FIG. 5 is an exploded perspective view of the hinge of FIG. 3.

FIG. 6 is a rear elevational view of the hinge of FIG. 3.

FIG. 7 is a cut-away perspective view of the hinge of FIG. 3, showing the reinforcing member embedded in the hinge.

DETAILED DESCRIPTION OF EXEMPLARY EMBODIMENTS

A door assembly in accordance with an exemplary embodiment of the present invention is depicted in FIGS. 1 through 7. While the invention will be described in detail hereinbelow with reference to this exemplary embodiment, it should be understood that the invention is not limited to the specific configuration shown in this embodiment. Rather, one skilled in the art will appreciate that a variety of configurations may be implemented in accordance with the present invention.

Figure 1:
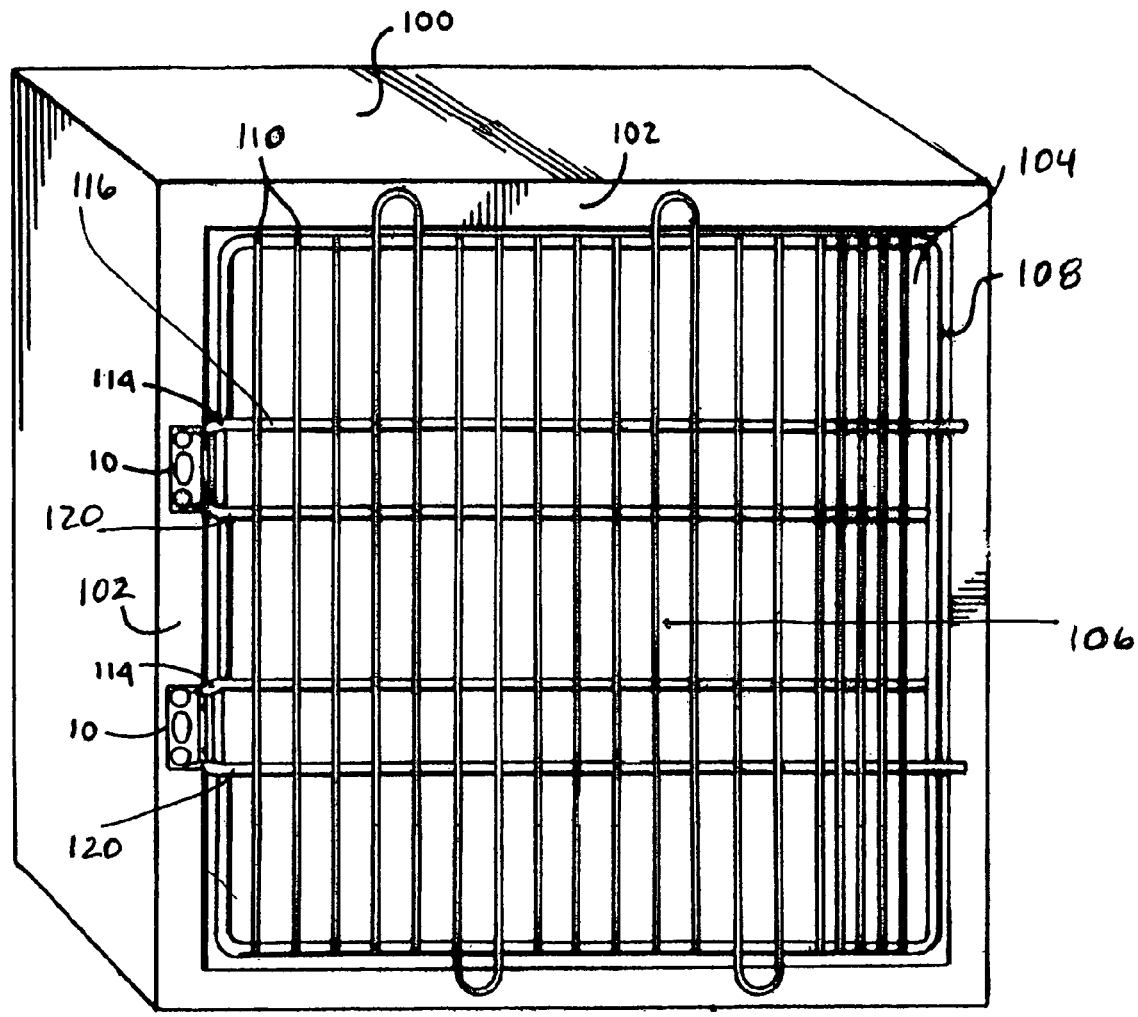
FIG. 1 is a perspective view of an animal cage having a door assembly in accordance with the present invention.
Figure 2:
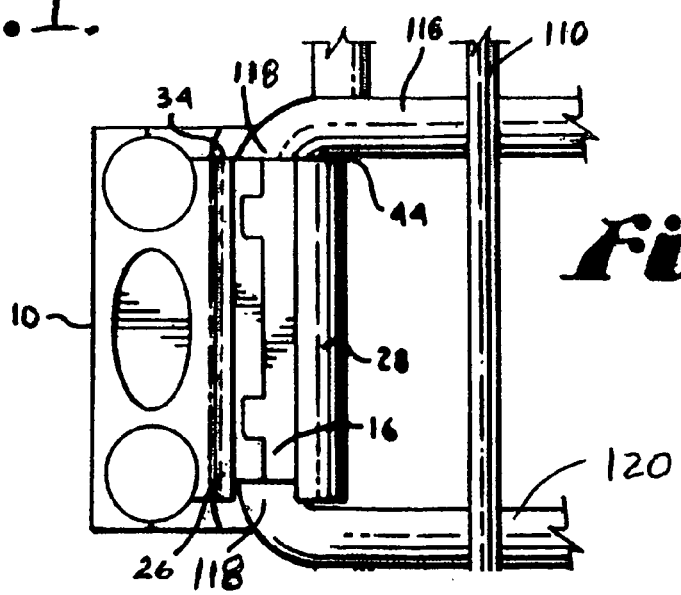
FIG. 2 is a partial front elevational view of the animal cage of FIG. 1, showing a portion of a pivot pin assembly and a cooperating hinge.

Looking to FIGS. 1 and 2, an animal cage 100 includes a front wall 102 having an opening 104 over which door 106 is pivotally mounted such that door 106 may be pivoted from a closed position (as shown) to an open position (not shown) to enable access to the interior of the cage. Door 106 is connected to the cage by two hinges 10 secured on the left side of the cage adjacent the opening. Door 106 is comprised of an outer frame 108 formed of metal rod sized and configured to correspond and fit within the perimeter of the opening. A plurality of vertical cage wires 110 extend across the door and are secured to the top and bottom of the frame via welding or other means known in the art.

A pair of pivot assemblies 114 integrally formed with the door cooperate with hinges 10 to pivotally mount the door to the cage.

As best seen in FIGS. 1 and 2, each pivot assembly 114 comprises an upper horizontal support member 116 extending across door 106 and merging into a vertical pivot pin 118 that extends downwardly to a lower horizontal support member 120 that extends back across the door. The horizontal members and pivot pin thus form a "U" shaped support that extends across the front of door 106 with the major axis of pivot pin 118 extending perpendicular or at a right angle from the major axis of the horizontal members 116. The horizontal members 120 are secured to the sides of frame 108 and to vertical cage wires 110 via welding or other means known in the art.

The cage door is preferably made of stainless steel rods and wires, but may be formed of other materials, including other metals, plastics, or composite materials having sufficient durability and strength to maintain shape and serve as an effective closure. While the door is formed of rods and wires to present a cage style door, it should be understood that the door may instead be formed with a solid surface extending across all or a portion of the door.

Attachment and Receptacle Portions of Hinge

Looking to FIGS. 1 through 5, hinge 10 includes an attachment portion 12 for securing the hinge to front wall 102 adjacent the opening, a receptacle portion 14 extending outwardly from the attachment portion, a bushing 16 positioned within the receptacle portion for receiving pivot pin 118, and a reinforcing member 18 embedded within the attachment and receptacle portions.

Turning to FIGS. 3 through 6, attachment portion 12 includes a flat rear surface 20 extending between an outermost edge 22 and an inner edge 24. The attachment portion tapers from a narrower thickness x at the outermost edge to a greater thickness y at its apex approximately one-third of the way across the attachment portion, then tapers back to a narrower thickness at inner edge 24. Thus, from a top-view perspective, attachment portion 12 forms a roughly triangular shaped body of hinge 10.

Integral with attachment portion 12, receptacle portion 14 comprises first and second outwardly extending supports 26, 28. First support 26 extends from near the thick apex of attachment portion 12, curving inwardly and forward to define an inner side 27 of a hinge barrel 30. At its upper and lower edges, first support 26 merges with attachment portion 12 via a slight, sharp, curvilinear step 32 so that the substantially horizontal top surface of support 26 defines a first shoulder 34 positioned slightly below the plane of the top surface 36 of attachment portion 12. The front surface 38 of first portion 26 is tapered to match the slope of the front surface 40 of attachment portion 12 so that the surfaces combine to form an integral, unitary surface.

Second support 28 extends from near the inner edge of attachment portion 14, curving outwardly and forward to define an outer side 29 of hinge barrel 30. At its upper and lower edges, second support 28 merges with attachment portion 12 via a gradually sloped step 42, so that the substantially horizontal top surface of second support 28 defines a shoulder 44, positioned slightly below the plane of the top surface 36 of attachment portion 12, and approximately level with the first shoulder 34 of the first support.

The front vertical edges 46, 48 of first and second supports 26, 28, respectively, define a gap 50 along the front of hinge barrel 30, with gap 50 having a width of approximately on half of the diameter of hinge barrel 30. The surfaces on the inner and outer sides 27, 29 of the hinge barrel 30 combine to form a smooth, unitary surface, with no discernible transition in the hinge barrel between the first support, attachment portion, and second support defining the barrel.

Attachment portion 12 and receptacle portion 14 are preferably made from a strong, lightweight material, such as a polymeric thermoplastic. Most preferably, they are made from nylon and glass or carbon fiber composite material such as Nylon 66. The attachment portion and receptacle portion may be manufactured using any process known in the art, such as molding or casting. Preferably, they are made using an injection molding process to allow the diameter of hinge barrel 30 to be held within a preferred tolerance.

Bushing of Hinge

Looking now to FIGS. 2, 3 and 5, bushing 16 is a generally cylindrical-shaped tube, with a bore 51 running vertically through its length. The diameter of bore 51 is sized to conform to the diameter of pivot pin 118 for connection with the hinge. A rectangular key 52 protrudes from the front side of the bushing, extending vertically along its length. A flange 54 around the inner upper edge of bushing 16 provides a tapered surface to receive and direct pivot pin 118 into bore 51.

As shown in FIG. 1, bushing 16 is positioned within hinge barrel 30 with key 52 aligned in the gap 50 between the first and second supports 26, 28. The outer diameter of the cylindrical portion of bushing 16 is approximately equal to the diameter of hinge barrel 30, described above. The width of key 52 is approximately equal to the width of gap 50, between first and second supports, as described above. Thus, with bushing 16 positioned within the hinge barrel, the bushing is frictionally affixed within the hinge barrel by the line-to-line fit between the outer surface of the bushing against the surfaces of the inner sides 27, 29 of the hinge barrel 30, and the frictional engagement between the outer surface of key 52 with the first and second supports 26, 28, along gap 50. With key 52 positioned in gap 50, bushing 16 is also prevented from rotating within hinge barrel 30.

As best seen in FIGS. 2 and 3, bushing 16 comprises first and second segments 56, 58, configured to mate with each other. First segment 56 includes protruding tabs 60 along its front and rear edges, with second segment 58 having receptacles 62 configured to receive and frictionally engage the tabs 60 of the first segment, and thus hold the two segments together to form a unitary bushing.

The configuration of bushing 16, with first and second segments 56, 58, permits the bushing to be secured around pivot pin 118, since the "U" shaped support does not permit pivot pin 118 to simply be inserted into the bushing. The two segments 56, 58 may be placed around pivot pin 118 and snapped together, trapping the pivot pin within the bushing. With the bushing thus joined around pivot pin 118, the bottom surface of horizontal member 116 rests on second shoulder 44 of second support 28.

Bushing 16 is preferably made from a strong, lightweight material, such as a polymeric thermoplastic. Most preferably, it is made from nylon self-lubricating composite material, such as a Nylon 66, self-lubricating plastic having one-percent molybdenum disulfide. Bushing 16 may be manufactured using any process known in the art, such as molding or casting. Preferably, it is made using an injection molding process to allow the inner diameter of bore 51 to be held within a preferred tolerance.

Looking back to attachment portion 12, as shown in FIG. 5, mounting apertures 64a, 64b located near the top and bottom edges 68, 70, respectively, are formed through the tapered body of the attachment portion to allow fasteners to pass through for securing the hinge to the front wall 102 adjacent opening 104. The mounting apertures are centered along a vertical axis v located approximately one-third of the way across the attachment portion from the outermost vertical edge 22 and slightly off-center from the apex of the thickest part of the attachment portion.

An oblong recessed area 72 is centered between the mounting apertures along vertical axis v, formed into the tapered surface of the attachment portion. The area 72 has a substantially flat inner lower surface 74 suitable for imprinting a logo, identification number or the like. Recessed area 72 further allows for hinge 10 to be manufactured using less material, resulting in a less-expensive and lighter-weight device. Looking to FIG. 6, a rectangular cutout area 73 on the rear surface 20 is centered between the mounting apertures 64a, 64b.

While the attachment portion is shown and described as being mounted to front wall 102 of cage 100, it should be understood that the attachment portion may be otherwise secured to the enclosure (directly or indirectly), without departing from the scope of the invention.

Reinforcing Member of Hinge

Looking to FIGS. 4 and 7, reinforcing member 18 comprises a plate 76 having a planar portion 78 extending between an outermost edge 80 and an inner edge 82, and a curvilinear portion 84 integral to, and extending outwardly and forwardly from, the planar portion. Curvilinear portion 84 transitions smoothly into planar portion 78 via a sloped step 86, such that the two portions merge into a unitary reinforcing member. As is apparent, planar portion 78 corresponds in shape and configuration to attachment portion 12, while curvilinear portion 84 corresponds in configuration to second support 28 of receptacle portion 14. Mounting apertures 86a, 86b through planar portion 78 allow fasteners to pass through the reinforcing member to attach the hinge to front wall 102 adjacent the opening.

As shown in FIGS. 4 and 5, reinforcing member 18 is embedded in hinge 10 with planar portion 78 positioned with attachment portion 12 and curvilinear portion 84 positioned within second support 28 of receptacle portion 14. Mounting apertures 86a, 86b of the reinforcing member align with the mounting apertures 64a, 64b in the attachment portion to allow the hinge to be mounted to front wall 102. As can be seen in FIG. 3, the diameter of the mounting apertures 86a, 86b of reinforcing member 18 is smaller than the diameter of the mounting apertures 64a, 64b of attachment portion 12. Thus, a portion of reinforcing member 18 is exposed as a shoulder 88a, 88b within each mounting aperture 64a, 64b in attachment portion 12. This configuration permits the head of a fastener to be received within mounting apertures 64a, 64b to engage the shoulders 88a, 88b of the reinforcing member to securely fasten the hinge to front wall 102, with the reinforcing member thus bearing the force of the attachment fasteners.

Reinforcing member 18 is preferably made from a strong material such as metal. Most preferably, reinforcing member 18 is made from a corrosion resistant metal, such as stainless steel. The reinforcing member may be made using any known manufacturing process. Most preferably, it is punched or cut and formed from sheet stock material.

While attachment portion 12, receptacle portion 14, and reinforcing member 18 have been described with respect to the features along the upper half of hinge 10, it should be understood that hinge 10 is symmetrical about horizontal axis h, such that the features of the lower half of hinge 10 are a mirror image of the upper half just described. Thus, the hinge is reversible so that it may be used equally to support doors hung for either right-hand or left-hand hinge mounting. With the hinge positioned in the desired orientation, the bushing is positioned in the hinge barrel and gap as described above with the flange end of the bushing facing up. Similarly, since the pivot assembly 114 comprises upper and lower horizontal supports extending from pivot pin 118, the door is reversible for attachment on either side of the enclosure.

Operation

As will be apparent to those skilled in the art, the door assembly of the present invention is well adapted to overcome the disadvantages of conventional door and hinge designs. Reinforcing member 18 is embedded within the hinge to provide strength to the hinge, and to assist in supporting the weight of an attached door. Shoulders 34, 44 on the first and second supports 26, 28 provide horizontal surfaces on which a horizontal support member of an attached door can rest. Curvilinear step 32 on first support 26 acts as a stop to the horizontal support member, preventing the door from being opened beyond a predetermined stop position. With the pivot pin forming an integral part of the door that is correctly aligned along the axis of rotation, the distribution of the weight of the door is applied evenly throughout the vertical pivot pin and the horizontal support members of the door. Thus supported, the door is prevented from sagging or twisting.

The door assembly of the present invention also allows for the simple removal and reattachment of the door without the need to use separate tools. With the door open and extending perpendicular from the hinge, it can easily be manually detached from the hinge. When the lower portion of each support member is aligned with the bottom opening of the hinge barrels, the pivot pin will slide out of the hinge as the door is lifted upward. The door may be reattached by sliding the pivot pins back into the hinge barrels while the door is similarly positioned.

As can be seen, the invention described herein provides a door assembly that prevents the sagging or twisting exhibited by conventional hinge designs. Of course, other embodiments or configurations will be apparent to those skilled in the art, and are contemplated by and within the scope of the present invention. For example, the pivot assembly may comprise a vertical pivot pin with a single horizontal support member extending from the pivot pin, as opposed to two horizontal support members. In addition, the attachment portion and receptacle portion of the hinge may be manufactured from materials other than nylon, such as metal or composites. The configuration of the receptacle portion of the hinge may be varied, with first and second supports 26, 28 extending further around hinge barrel 30 to leave a narrower gap 50 between the two. Of course, in such a configuration, the width of receptacle key 52 in bushing 16 would likewise be adapted to conform to width of the gap. These and other variations will be apparent to those skilled in the art, and are within the scope of the present invention.

The term "substantially" or "approximately" as used herein may be applied to modify any quantitative representation that could permissibly vary without resulting in a change in the basic function to which it is related. For example, while the top surface of attachment portion 12 is described as being substantially horizontal, it may permissibly vary from that orientation if the variance does not materially alter the capability of the invention.

While the present invention has been described and illustrated hereinabove with reference to various exemplary embodiments, it should be understood that various modifications could be made to these embodiments without departing from the scope of the invention. Therefore, the invention is not to be limited to the exemplary embodiments described and illustrated hereinabove, except insofar as such limitations are included in the following claims.

What is claimed and desired to be secured by Letters Patent is as follows:

1. An animal enclosure, comprising:
    an enclosure for containing an animal, said enclosure comprising exterior walls and an opening through which an interior of the enclosure may be accessed;
    a door configured to be mounted over the opening of the enclosure, wherein said door comprises at least one pivot pin assembly comprising a pivot pin formed integrally with two supports members, wherein an upper support member extends at an angle from an upper end of said pivot pin and a lower support member extends at an angle from a lower end of said pivot pin;
    a hinge comprising an attachment portion and a receptacle portion, wherein said attachment portion is securely connected to one of the exterior walls of said enclosure adjacent the opening of the enclosure, and wherein said receptacle portion has a hinge barrel defining a gap configured to receive said pivot pin such that said pivot pin may rotate within said hinge barrel to move the door from a closed position to an open position and
    wherein said pivot pin is removable from said hinge barrel to permit removal of said door from said enclosure without removal of said attachment portion of said hinge from said enclosure.

2. The animal enclosure of claim 1, wherein said pivot pin is vertically aligned along one side of the door adjacent the opening.

3. The animal enclosure of claim 2, wherein said upper and lower support members each extend from said pivot pin at an angle of about 90 degrees.

4. The animal enclosure of claim 1, wherein said pivot pin is vertically aligned along one side of the door adjacent the opening and said upper and lower support members extend horizontally from said pivot pin across a majority of the door toward an opposite side of said door.

5. The animal enclosure of claim 4, wherein said pivot pin and upper and lower support members are integrally formed together from a metallic material.

6. The animal enclosure of claim 5, wherein said pivot pin and upper and lower support members are integrally formed together from stainless steel.

7. The animal enclosure of claim 4, wherein said hinge barrel is reinforced with a metal plate.

8. The animal enclosure of claim 4, wherein said hinge additionally comprises a bushing frictionally engaged within said hinge barrel, said bushing adapted to receive said pivot pin.

9. The animal enclosure of claim 8, wherein said bushing comprises a first member releasably affixed to a second member defining a pivot pin aperture there between.

10. The animal enclosure of claim 8, wherein said bushing comprises a self-lubricating plastic material.

11. The animal enclosure of claim 9, wherein said bushing comprises a key adapted to engage with said hinge barrel such that said bushing is prevented from rotating within said barrel.

12. The animal enclosure of claim 1, wherein said pivot pin assembly and said hinge barrel are substantially symmetrical about a horizontal axis such that said door is reversible for pivotal attachment to either side of the enclosure.

13. The animal enclosure of claim 1, wherein the door can be manually attached to the enclosure and removed from the enclosure without the need for tools.

14. An animal enclosure, comprising:
    an enclosure for containing an animal, said enclosure comprising exterior walls and an opening through which an interior of the enclosure may be accessed;
    a door configured to close an opening of the enclosure when said door is in a closed position, said door comprising at least one vertically extending pivot pin formed integrally with two opposing horizontal support members extending from each end of said pivot pin;

a hinge comprising an attachment portion adapted to be coupled with one of the exterior walls of the enclosure adjacent the opening, a receptacle portion formed integrally with said attachment portion and cooperating with said attachment portion to present a hinge barrel defining a gap, and a bushing adapted to receive said pivot pin and to be positioned within said hinge barrel; and wherein said pivot pin is removable from said hinge barrel to permit removal of said door from said enclosure without removal of said attachment portion of said hinge from said enclosure.

15. The animal enclosure of claim 14, wherein said hinge additionally comprises at least one support shoulder integrally formed with said attachment portion and said receptacle portion for receiving and supporting a portion of one of said horizontal support members.

16. The animal enclosure of claim 14, wherein said hinge additionally comprises upper and lower support shoulders integrally formed with said attachment portion and said receptacle portion for receiving and supporting a portion of said horizontal support members.

17. The animal enclosure of claim 14, further comprising a reinforcing member embedded in said attachment portion and said receptacle portion.

18. The animal enclosure of claim 17, wherein said reinforcing member comprises a plate having a planar section and a curvilinear section, the latter being partially embedded in said hinge barrel.

19. The animal enclosure of claim 15, wherein said at least one support shoulder comprises a first support having a first shoulder extending around an outermost perimeter of said hinge barrel and a second support having a second shoulder extending around an innermost perimeter of said hinge barrel.

20. The animal enclosure of claim 14, wherein said hinge is substantially symmetrical about a horizontal axis such that said hinge is reversible for use with right-handed and left-handed doors.

21. The animal enclosure of claim 14, wherein said bushing comprises a first member releasably affixed to a second member defining a pivot pin aperture there between.

22. The animal enclosure of claim 21, wherein said bushing comprises a self-lubricating plastic material.

23. The animal enclosure of claim 22, wherein said bushing comprises a key adapted to engage with said hinge barrel such that said bushing is prevented from rotating within said barrel.

24. The animal enclosure of claim 14, wherein said door assembly is constructed such that the door can be manually attached to the enclosure and removed from the enclosure without the need for tools.

25. An animal enclosure, comprising:
an enclosure for containing an animal, said enclosure comprising exterior walls and an opening through which an interior of the enclosure may be accessed; a door configured to fit over said opening when in a closed position, said door comprising upper and lower support members each of which comprises a horizontal bar extending across a portion of said door and an angled portion integrally formed at an end of said horizontal bar;
a hinge comprising an attachment portion and a receptacle portion, wherein said attachment portion is connected to one of the exterior walls of said enclosure adjacent said opening of said enclosure, and wherein said receptacle portion has a hinge barrel defining a gap configured to receive said angled portions of said upper and lower support members such that said angled portions may rotate within said hinge barrel to move said door from said closed position to an open position; and wherein said angled portions are removable from said hinge barrel to permit removal of said door from said enclosure without removal of said attachment portion of said hinge from said enclosure.

26. The animal enclosure of claim 25, wherein said angled portion of said upper support member is integrally formed with said angled portion of said lower support member so as to form a vertical pivot pin.

27. The animal enclosure of claim 25, wherein said angled portions of said upper and lower support members and said hinge barrel are substantially symmetrical about a horizontal axis such that said door is reversible for pivotal attachment to either side of said enclosure.

28. The animal enclosure of claim 25, wherein said door can be manually attached to said enclosure and removed from said enclosure without the need for tools.

29. An animal enclosure, comprising:
an enclosure for containing an animal, said enclosure comprising exterior walls and an opening through which an interior of the enclosure may be accessed;
a door configured to be mounted over the opening of the enclosure, said door comprising at least first and second pivot pin assemblies each of which comprises a pivot pin and two supports members, wherein an upper support member extends at an angle from an upper end of said pivot pin and a lower support member extends at an angle from a lower end of said pivot pin;
at least first and second hinges corresponding to said first and second pivot pin assemblies, respectively, wherein each said hinge comprises an attachment portion connected to said enclosure adjacent the opening of the enclosure and a receptacle portion configured to receive said corresponding pivot pin such that said corresponding pivot pin may rotate within said receptacle portion to move the door from a closed position to an open position; and
wherein said first and second hinges are configured to permit removal of said door from said enclosure without removal of said attachment portions of said hinges from said enclosure.

30. The animal enclosure of claim 29, wherein each said pivot pin is vertically aligned along one side of the door adjacent the opening of the enclosure.

31. The animal enclosure of claim 29, wherein each said pivot pin is vertically aligned along one side of the door adjacent the opening of the enclosure and said upper and lower support members extend horizontally from said pivot pin across a majority of the door toward an opposite side of the door.

32. The animal enclosure of claim 29, wherein said pivot pin and upper and lower support members of each of said first and second pivot pin assemblies are integrally formed together from a metallic material.

33. The animal enclosure of claim 29, wherein said first and second pivot pin assemblies and corresponding hinges are substantially symmetrical about a horizontal axis such that said door is reversible for pivotal attachment to either side of the enclosure.

34. The animal enclosure of claim 29, wherein said door can be manually attached to the enclosure and removed from the enclosure without the need for tools.

* * * * *